(12) United States Patent
Stone

(10) Patent No.: US 10,058,941 B2
(45) Date of Patent: Aug. 28, 2018

(54) COLLAPSIBLE PORTABLE PANEL SAW AND METHOD

(71) Applicant: Paul R. Stone, Federal Way, WA (US)

(72) Inventor: Paul R. Stone, Federal Way, WA (US)

(*) Notice: Subject to any disclaimer, the term of this patent is extended or adjusted under 35 U.S.C. 154(b) by 255 days.

(21) Appl. No.: 14/987,748

(22) Filed: Jan. 4, 2016

(65) Prior Publication Data

US 2016/0129508 A1    May 12, 2016

Related U.S. Application Data

(60) Provisional application No. 62/009,259, filed on Jun. 8, 2014.

(51) Int. Cl.
*B23D 47/02* (2006.01)
*B27B 5/07* (2006.01)

(52) U.S. Cl.
CPC ............ *B23D 47/02* (2013.01); *B27B 5/07* (2013.01)

(58) Field of Classification Search
CPC .......... B27B 5/07; B27B 27/02; B27B 5/075; B23D 47/02; B23D 45/021; B23D 45/046; B23D 59/001; B26D 7/01; Y10T 83/8763; Y10T 83/05; Y10T 83/7768; Y10T 83/7763; Y10T 83/7693; Y10T 83/7784; Y10T 83/7697; Y10T 83/6584; Y10T 83/778; Y10T 83/7507
USPC ........ 83/486, 34, 526, 485, 471.2, 489, 425, 83/471.3, 473, 432, 614
See application file for complete search history.

(56) References Cited

U.S. PATENT DOCUMENTS

| | | | | |
|---|---|---|---|---|
| 3,008,498 A | * | 11/1961 | Olson ................. | B23D 47/025 144/242.1 |
| 3,213,908 A | * | 10/1965 | Schutz ................ | B27B 5/07 144/250.13 |
| 3,866,496 A | * | 2/1975 | Payne ................. | B23D 45/024 83/471.3 |
| 4,802,399 A | * | 2/1989 | Olson .................. | B23D 47/02 384/55 |
| 5,473,968 A | * | 12/1995 | Break ................. | B23D 47/025 144/286.5 |
| 2006/0032356 A1 | * | 2/2006 | Newman, Jr. ....... | B23D 45/046 83/486 |
| 2006/0060049 A1 | * | 3/2006 | Learnard ............. | B27B 5/07 83/485 |
| 2013/0139663 A1 | * | 6/2013 | Stone .................. | B23D 47/02 83/34 |

* cited by examiner

*Primary Examiner* — Ghassem Alie
(74) *Attorney, Agent, or Firm* — John D. Long, Esq.; Long & Chybik

(57) ABSTRACT

The invention is a panel saw and a method for same, the panel saw has a railing set supporting a power cutting tool-carriage combination capable of moving along at least a portion of a length of the railing set; a framework that removably connects the railing set to a frame support that holds the railing set in a semi-upright canted operating position; the frame support has two backing panels each of which having movably attached support panel that allows the backing panel to obtain a semi-upright canted operating position, wherein the framework removably attaches each of the two backing panels to hold the two backing panels in a spaced apart, coplanar relationship to one another further creating a cutting space for the power cutting tool between the two backing panels.

11 Claims, 23 Drawing Sheets

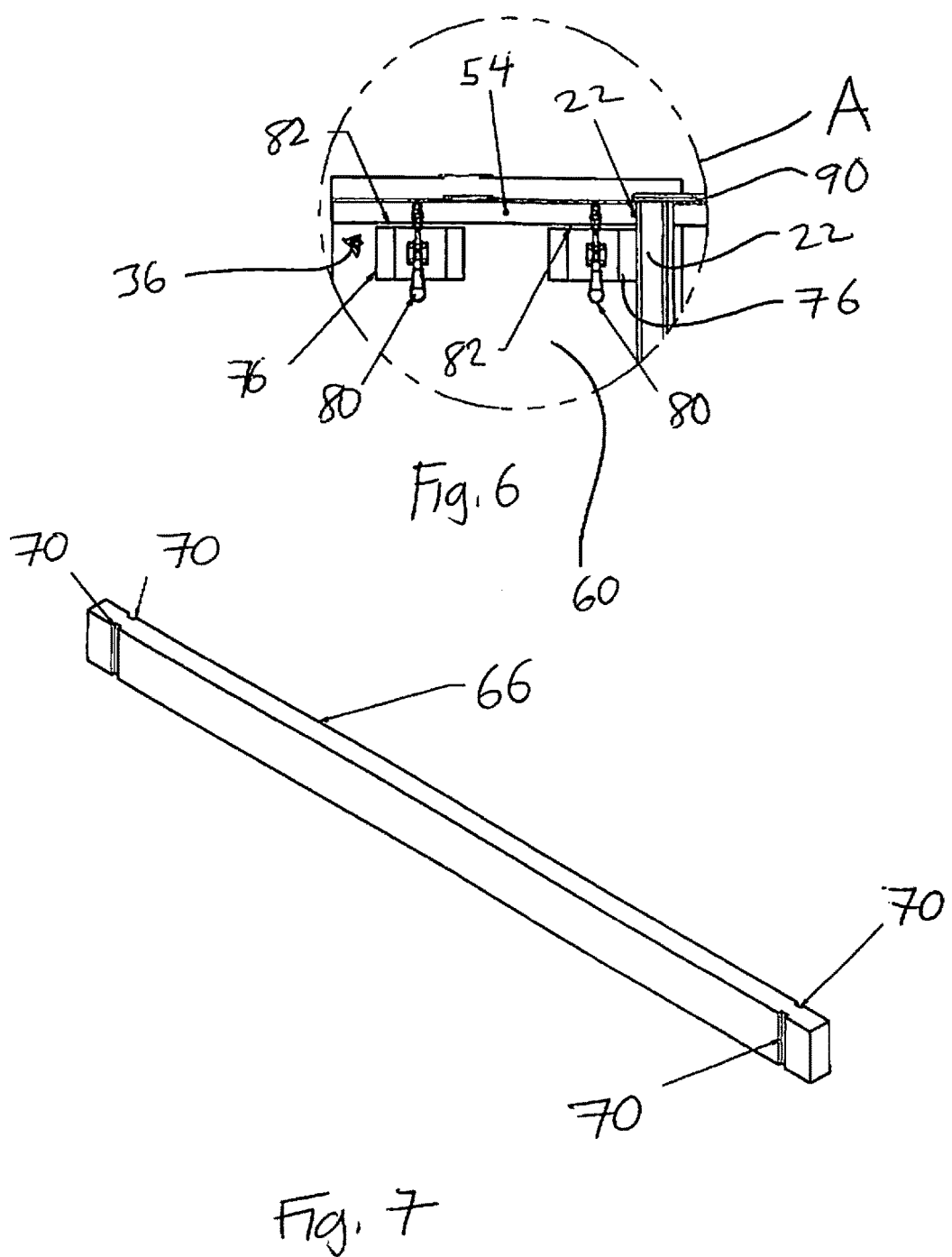

COLLAPSIBLE PORTABLE PANEL SAW AND METHOD

CROSS-REFERENCES TO RELATED APPLICATIONS

Not Applicable.

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention relates to panel saws. More particularity to panel saws that incorporate a collapsible support structure to allow the panel saw to be placed into a compact state for storage, transport and the like.

BACKGROUND

In various commercial and home-based DIY (i.e., Do-it-Yourself) construction and manufacturing concerns, there may arise a need to cut large sheets of material into smaller panels of specific shapes and dimensions. Typical sheet materials may include wood, wood composition material (e.g., plywood), melamine (for carpentry, cabinetry, furniture manufacture, etc.), aluminum, plastic (for the signage construction) and the like. Generally, the size of these sheets prohibit the use of readily available and inexpensive table saws and require instead the less readily available and more expensive panel saws.

Panel saws may come in two orientations: a vertical panel saw and a horizontal panel saw, of the two the larger vertical panel saw may offer greater capability and versatility. The panel saws may also varying in expense, complexity, capability; ranging from costly CNC controlled types to less expense manually adjusted panel saws. Generally, usage, space limitation, and monetary concerns determine the selection of type of panel saw.

Panel saws may comprise of a framework, a linear guide, a carriage, and a powered tool (e.g., a powered saw) or knife. The linear guide (e.g., a pair of parallel, spaced-apart railings) could be attached at the framework's top and bottom edges. This placement could substantially provide for a space between the linear guide and front side of the framework through which the material to be cut could pass to come into contact with the tool. The linear guide's placement upon the framework could further place the railings to be generally perpendicular with respect to the bottom edge of the framework generally causing a bisection of the framework.

The carriage could be movably mounted to the linear guide utilizing bearings that ride upon the railings so as to generally locate the carriage between the railing pair. The tool could be mounted on the carriage to allow a cutting surface or element of the tool to be placed between the railing pair as well. The carriage and tool combination could move freely along the length of the linear guide and cut across the width (e.g., height) of the framework, unless locked into place at a desired height on the guide. Some carriage versions may further provide for a rotation of the cutting tool within the carriage to orient the tool for use when the carriage is moved down along the guide or when the carriage is fixed at a point on the guide (and material is being feed into the tool.) By adjusting the orientation of the tool (e.g., powered circular saw) within the carriage, the tool may provide two kinds of cuts: cross cuts (e.g., vertical/widthwise) or rip cuts (e.g., horizontal/lengthwise).

For example, when the rip cut is desired, the carriage/tool combination could be fixed at a certain position on the linear guide (e.g., at the height on the linear guide where the rip cut will occur on the material being inserted into the framework) and with the orientation of the cutting surface/element (e.g., saw blade) being parallel to the bottom edge of the framework (e.g., perpendicular to the railings of the linear guide. When the tool is activated, the operator could feed a sheet of material into the framework. This feeding action could result in the material being moved into the powered saw at a fixed height to allow the saw blade to impart a rip cut (e.g., a horizontal cut at a constant height) in the material.

If on the other hand the cross cut is desired then the cutting surface/element could be oriented perpendicular to the bottom edge of framework (e.g., parallel to the railings of the linear guide) with the carriage/tool being raised up to the top of the linear guide to generally clear any material that may be loaded or moved into the saw. As the operator places material into the framework and the portion of material to be cut is between the linear guides and the frame work, the operator can lock the portion in place relative to the framework. As power is applied to the tool, the operator could move the carriage along the linear guide to allow the tool to vertically engage the material as fixed proximate to the framework.

While considered a useful tool, one possible operational drawback for a panel saw could be its bulk or size, which generally makes the device otherwise practically non-portable if not purely stationary. Such a lack of mobility could preclude the panel saw from being transported easily from one worksite to another worksite especially for building construction jobs and the like. A panel saw can also exert a large foot print and take up significant operation space especially for DIY (e.g., Do It Yourselfer) or consumer-based usage. A panel saw that can be easily compacted to a storage size much smaller than it operational size could make panel saw easier to transport (e.g., by motor vehicle) as well. Such a compacting frame work could allow the panel saw to move back from a compacted state to operational state without loss of accuracy or cutting ability.

What could be generally needed is a panel saw that could incorporate a simple framework that can easily move into and out of a compact storage and transport without an overall loss of accuracy or cutting ability when placed in the non-compact operating position.

BRIEF DESCRIPTION OF ONE EMBODIMENT OF THE PRESENT INVENTION

One possible embodiment of the invention could be a vertical panel saw comprising a framework supporting a set of railings, the railings being held in a parallel and spaced apart orientation to one another and to the framework; a carriage having at least two pairs of opposing carriage side edges and at least one tool securing means for securing a power tool to the carriage, one pair of the at least two pairs of opposing carriage side edges removably engages the set of railings to movably locate the carriage between the set of railings to allow the carriage to move along the railings; wherein the carriage moves in and out of contact with the railings through the top ends of the railings to allow the one pair of the at least two pairs of carriage side edges to be moved out of contact with the set of railings while alternately allowing the remaining pair of opposing carriage side edges to removably engage the set of railings in a manner that lets the carriage move along the railings.

Another possible embodiment of the invention could be a methodology of operating a vertical panel saw comprising of the following steps but not necessarily in the order shown: providing a vertical panel saw, the vertical panel saw comprising a framework and a carriage, the framework supporting a set of railings, the railings being held in a parallel and spaced apart orientation to one another and to the framework, the carriage having at least two pairs of opposing carriage side edges, the opposing carriage side edges of one pair being perpendicularly oriented relative to the opposing carriage side edges of the remaining pair, the carriage capable of supporting a power tool, one pair of the at least two pairs opposing carriage side edges movably engages the set of railings to allow the carriage to move between and along the railings; removing the one pair of the at least two pairs of opposing carriage side edges from engagement with the set of railings through top ends of the set of railings; and engaging the remaining pair of the at least two pairs of opposing carriage side edges with the set of railings through top ends of the set of railings.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 6 is substantially a frontal elevation detail A view from FIG. 1 substantially showing the locking mechanisms holding the top framework portion of one possible embodiment of invention.

FIG. 7 is substantially a perspective view of a support board for one possible embodiment of the invention.

FIG. 17A is substantially a side elevation view of the framework-rail set combination being loaded upon the frame support in one possible embodiment of the invention.

SUMMARY OF ONE EMBODIMENT OF THE INVENTION

Figure 1:
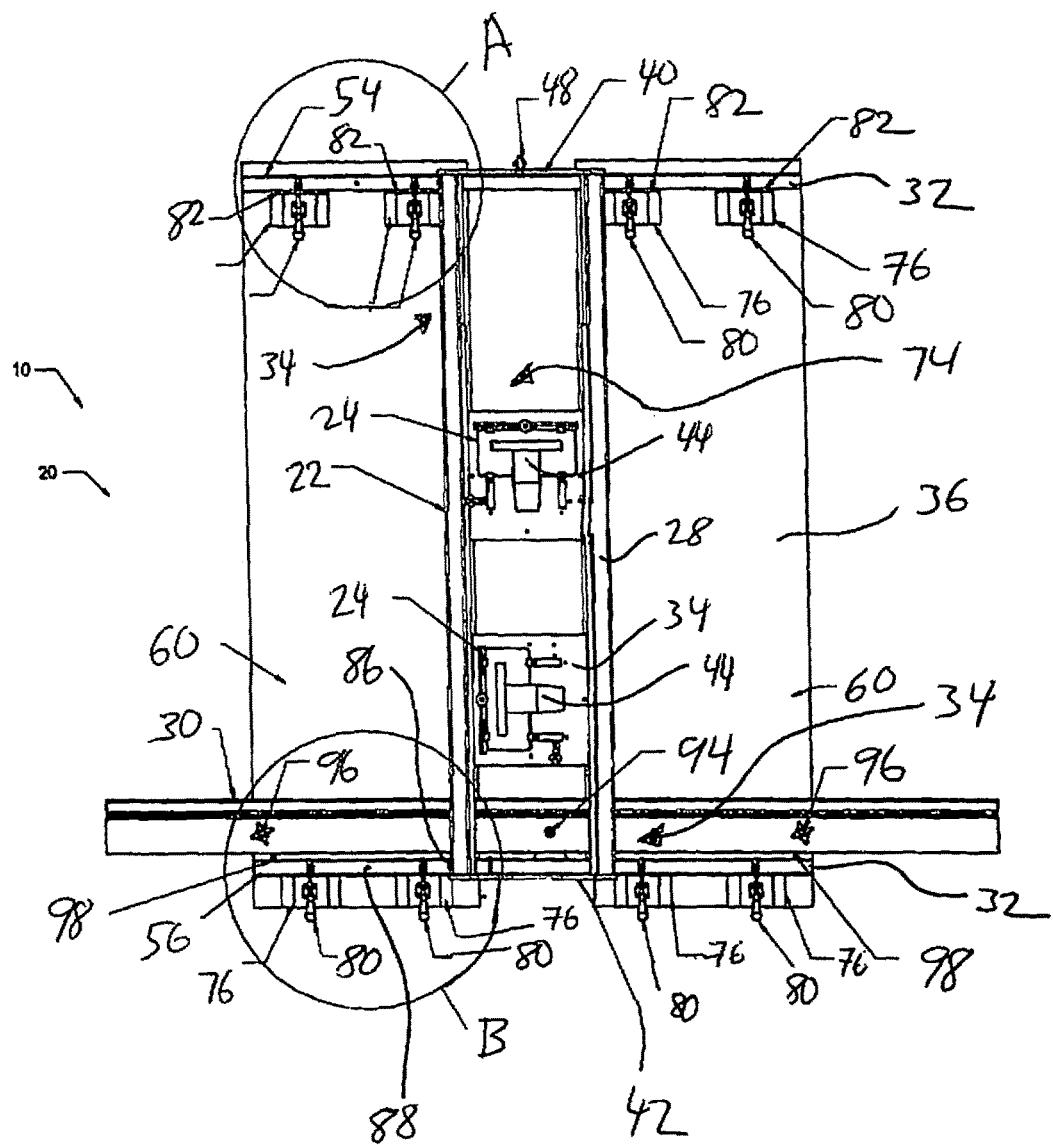
FIG. 1 is substantially a frontal elevation view of one possible embodiment of the present invention further showing the carriage-power cutting tool combination in both vertical and horizontal orientations.
Figure 2:
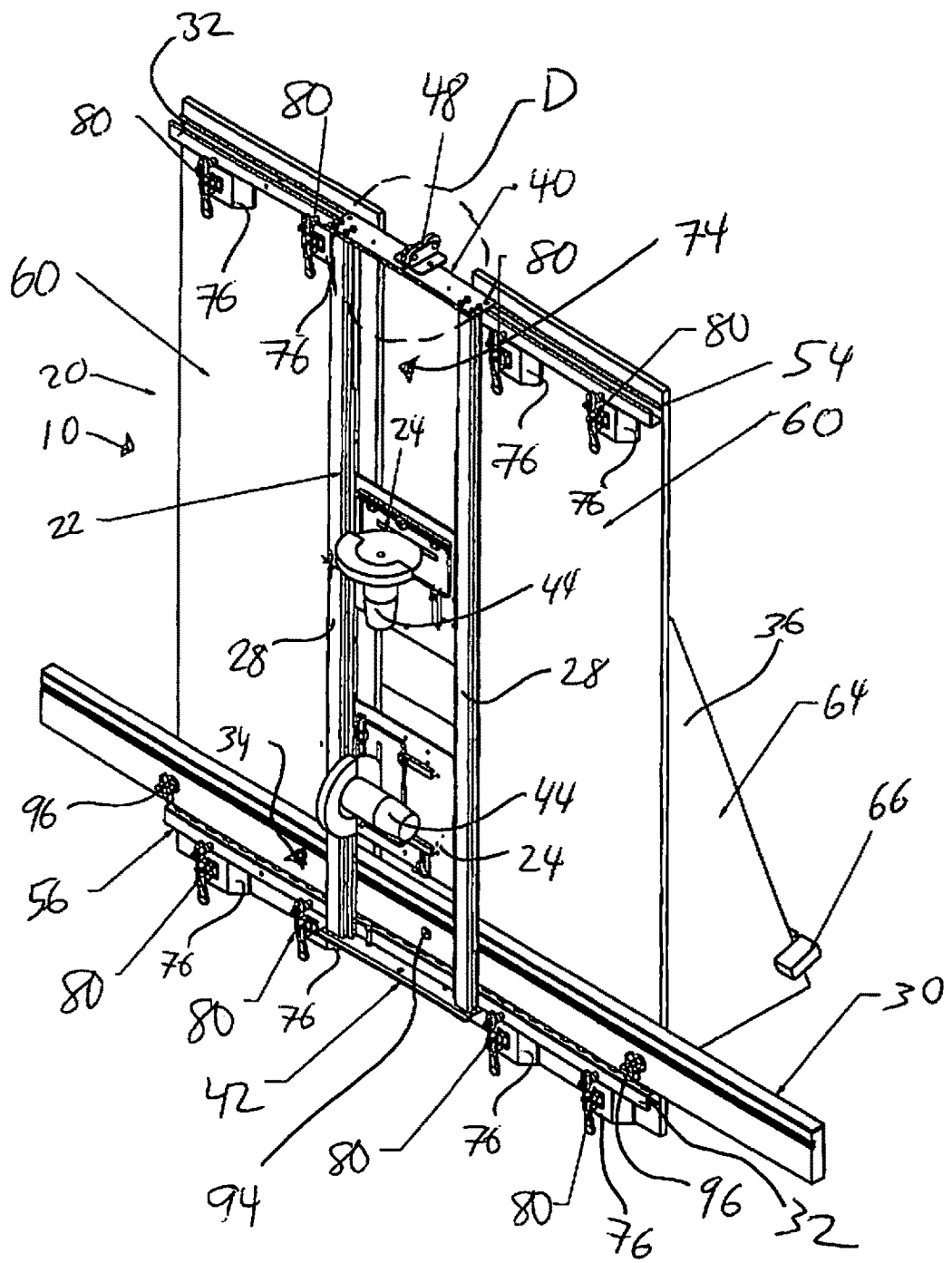
FIG. 2 is substantially a frontal prospective view of one possible embodiment of the invention further showing the carriage-power cutting tool combination in both vertical and horizontal orientations.
Figure 3:
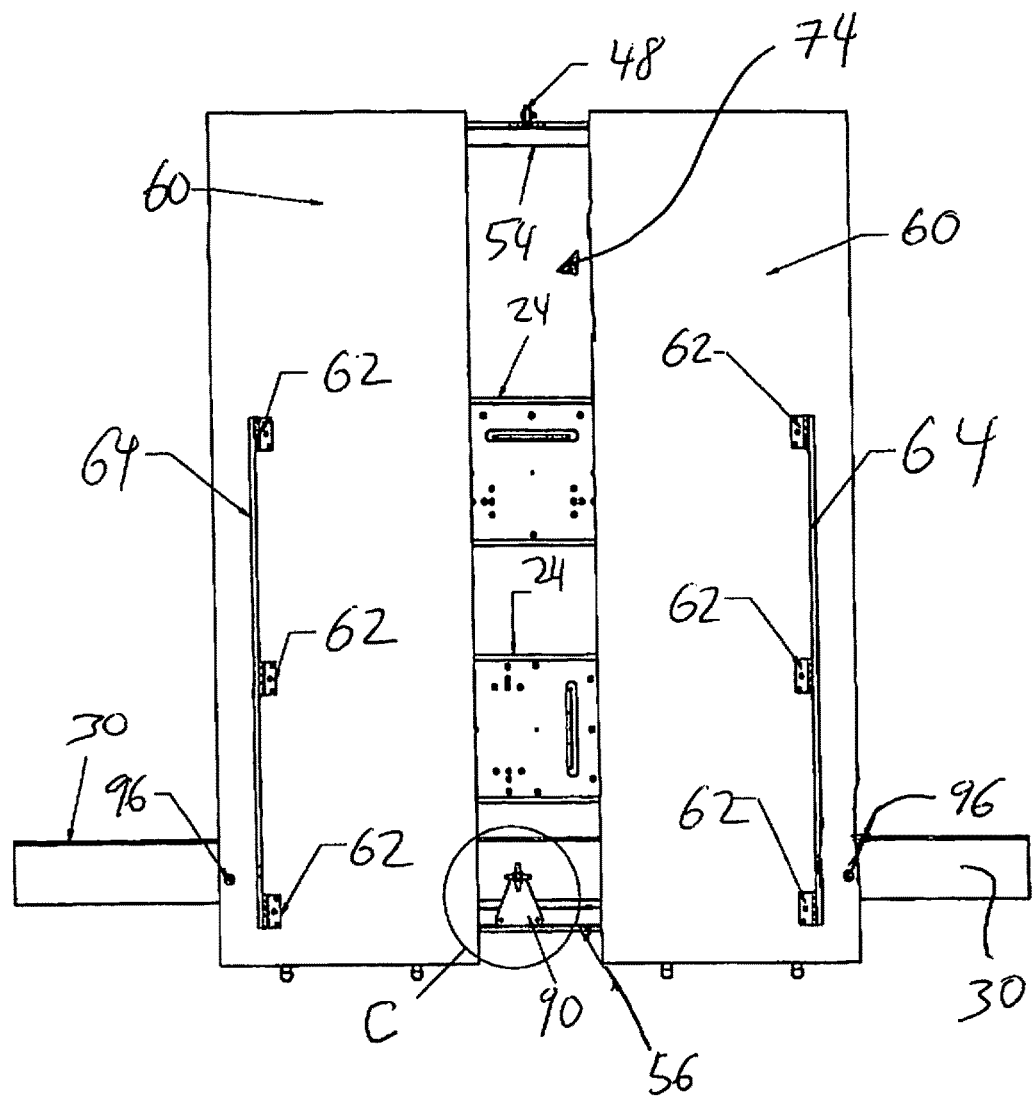
FIG. 3 is substantially a back elevation view of another possible embodiment of invention further showing the carriage-power cutting tool combination in both vertical and horizontal orientations.

Advantages of One or More Embodiments of the Present Invention

The various embodiments of the present invention may, but do not necessarily, achieve one or more of the following advantages:

to provide a panel saw that has a collapsible support structure that can be compacted to allow for easy transport and storage of the invention; and the ability to rapidly collapse and set up the same without loss of accuracy.

provide a compacting panel saw that can cooperate in compact space where it would be otherwise be impractical if not impossible to have a ordinarily non compacting panel saw;

the ability to compact and move a panel saw to allow other tools to be used at site otherwise occupied by a panel saw; and provide a panel saw that can be compacted to be loaded by one person onto a passenger vehicle like a sports utility vehicle or van for transportation.

These and other advantages may be realized by reference to the remaining portions of the specification, drawings, claims, and abstract.

Brief Description of One Embodiment of the Present Invention

One possible embodiment of the invention could be a panel saw comprising a railing set, the railings of the railing set being held in a parallel and spaced-apart orientation to one another to movably support a power cutting tool-carriage capable of moving along at least a portion of a length of the railing set; a framework that removably attaches to the railing set, the framework further removably connects the railing set to a frame support that holds the railing set in a semi-upright canted operating position; a frame support comprising of two backing panels, each backing panel having a movably connected support panel that when placed perpendicular to the respective backing panel allows the placement of the backing panel in a semi-upright canted operating position; wherein the framework removably attaches to the two backing panels to hold the two backing panels in a spaced apart coplanar relationship to other creating a cutting space between the two backing panels, the cutting space having dimensions that allows a cutting edge of the power cutting tool to pass between the two backing panels without contacting the two backing panels during operation.

Another possible embodiment of the invention could be a method of assembling a panel saw comprising of the following steps but not necessarily in the order shown providing a panel saw, the panel saw comprising a railing set having a power cutting tool-carriage combination that moves along a length of the railing set, a framework of a top framework railing and a bottom framework railing, a frame support of two backing panels, each backing panel having movably connected support panel; removably connecting the two framework railings in a perpendicular orientation to respective ends of the railing set; placing the two backing panels into a semi-right canted operating position wherein the backing panels are spaced apart and coplanar with one another; removably connecting a framework-railing set combination to the two backing panels; and forming a cutting space that allows the operation of the cutting edge of the power cutting tool between the backing panels without contacting either backing panel regardless of the orientation of the cutting tool relative to the railing set.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

Description of Certain Embodiments of the Present Invention

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

As substantially shown in FIGS. 1 to 11, the invention 10 could comprise of a collapsible portable panel saw 20, a method or process of assembly 200 or both. One possible embodiment of the collapsible portable panel saw 20 could comprise a fixed railing set 22 which could removably hold a carriage 24 that removably supports a powered cutting tool 26 to generally allow the combination of carriage and powered cutting tool to move along the substantial length of the railing set 22. The fixed railing set 22 could be removably attached to a framework 32 that otherwise also could dissembled into a compact state. The framework-railing set combination 34 along with a cutting fence 35 can be held up and away from the ground by a frame support 36.

The railing set 22 could comprise generally of a pair of railings 38 held apart and in parallel by a top end plate 40 and bottom end plate 42. The top end plate 40 could connect a pair of top railing ends while the bottom end plate 42 could connect a pair of bottom railing ends. Each railing 38 could have lengthwise carriage grove or the like structural element (not shown) that could allow the carriage 24 to engage and move along the substantial length of the railing 28. Each carriage grove could have a suitable aperture (not shown) that allows the carriage 24 to be movably attached to the railing set 22 without the need to assemble or dissemble the railing set 22.

The carriage 24 could support (e.g., removably) the power cutting tool 44, typically a circular saw (or a router-not shown.) A carriage-power cutting tool combination could removably engage the railing set 22 and slide (or possibly roll) along the general length of the railing set 22 to allow the railing set 22 to substantially control the cutting motion of the power cutting tool 44. If a power saw is used as the power cutting tool 44, the carriage 24 holding the power cutting tool 44 could be placed in two possible orientations with regards to the railing set 22: a vertical operation for crosscutting (e.g., the carriage-power cutting tool combination moves along the railing set to cut) and horizontal operation for rip cuts (e.g., the carriage tool combination is locked in place upon the railing set and workpiece [not shown] being cut moves through the invention.) If the power cutting tool 44 is a router (not shown) then the power cutting tool 44 is capable of cutting both vertical and horizontal directions (horizontal direction requires locking the router in place on the railing set 22.

Figure 23:
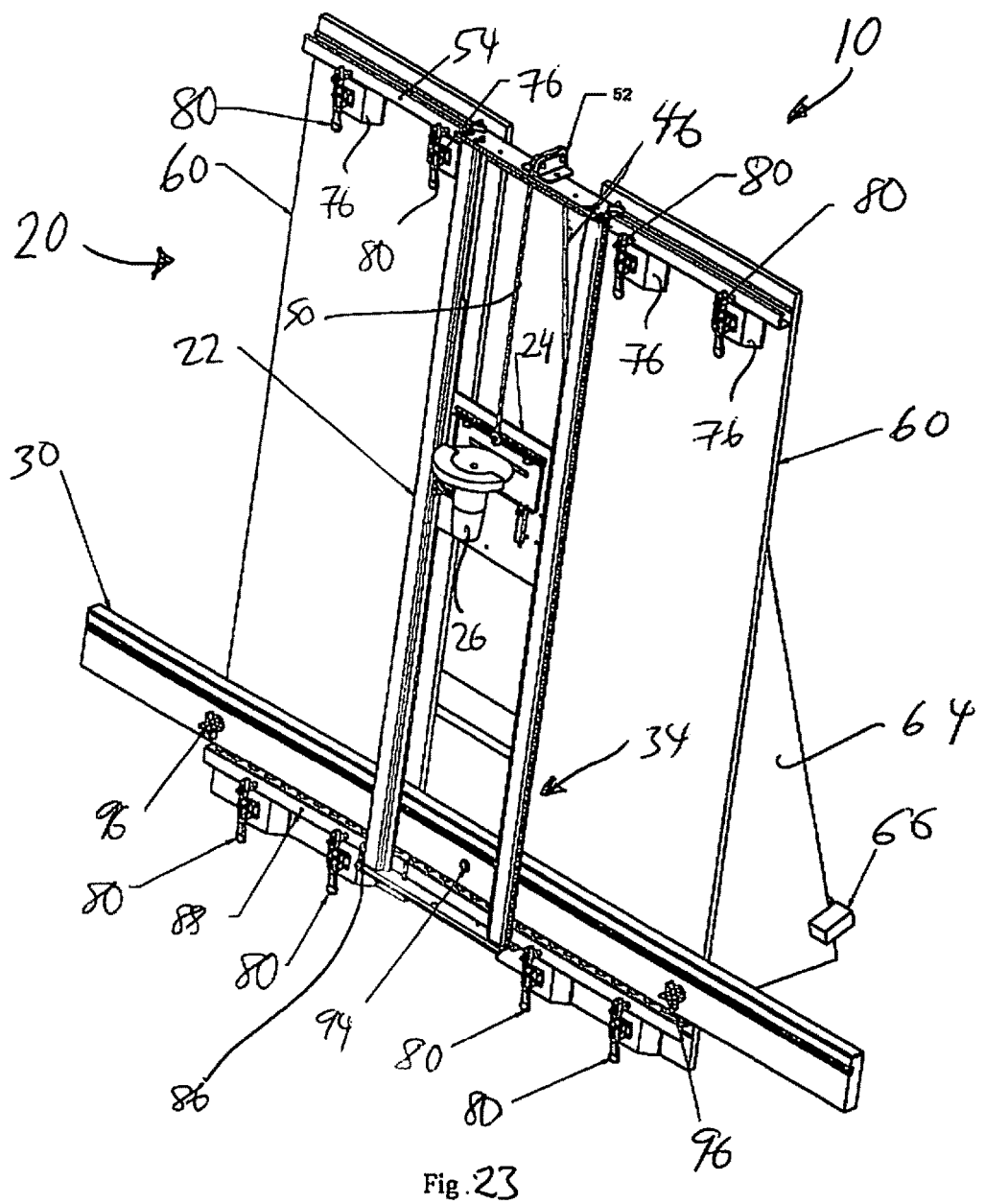
FIG. 23 is substantially a frontal perspective view of one embodiment of the invention in the canted operating position.
Figure 24:
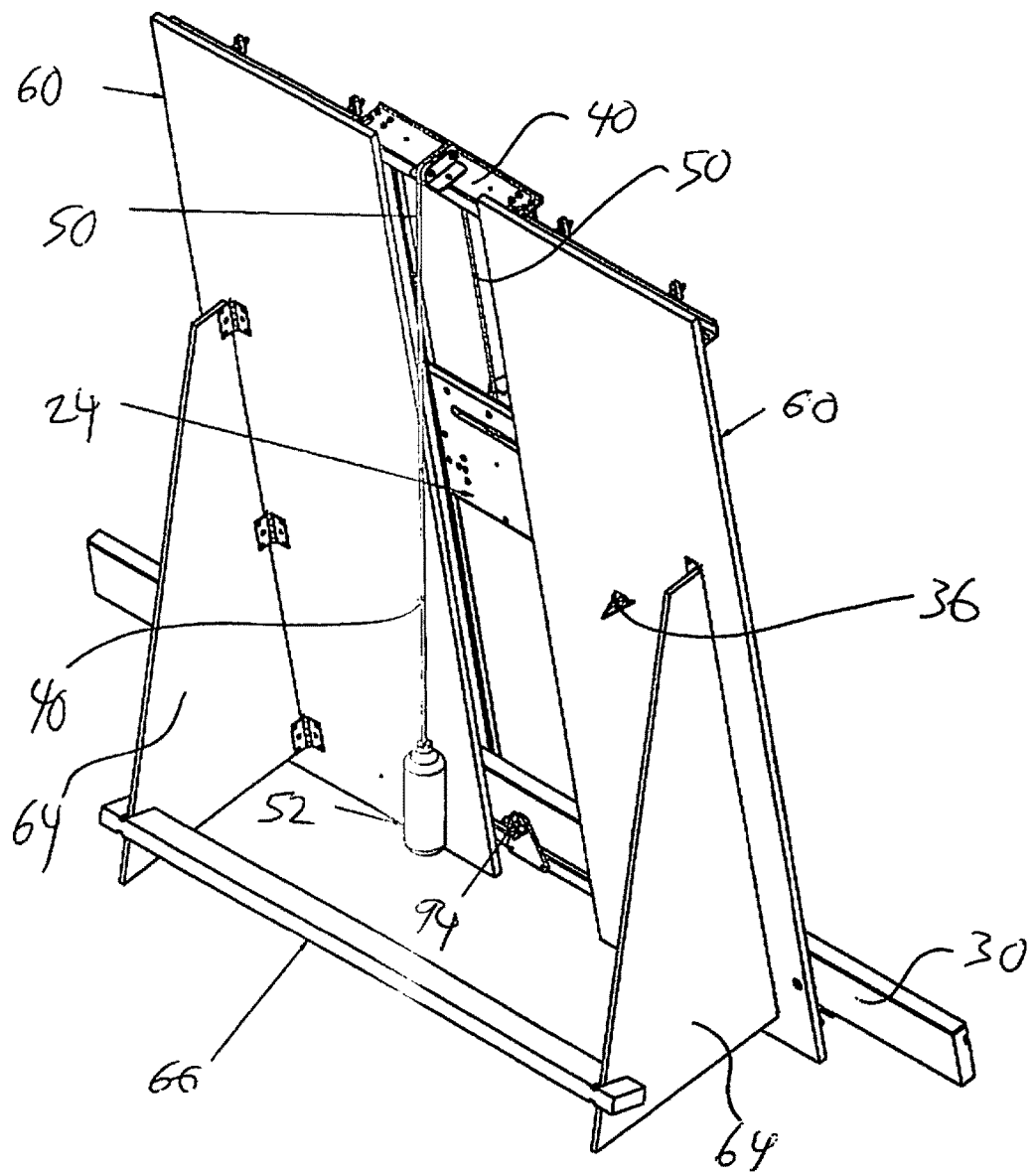
FIG. 24 is substantially a rear perspective view of one embodiment of the invention in the canted operating position.
Figure 25:
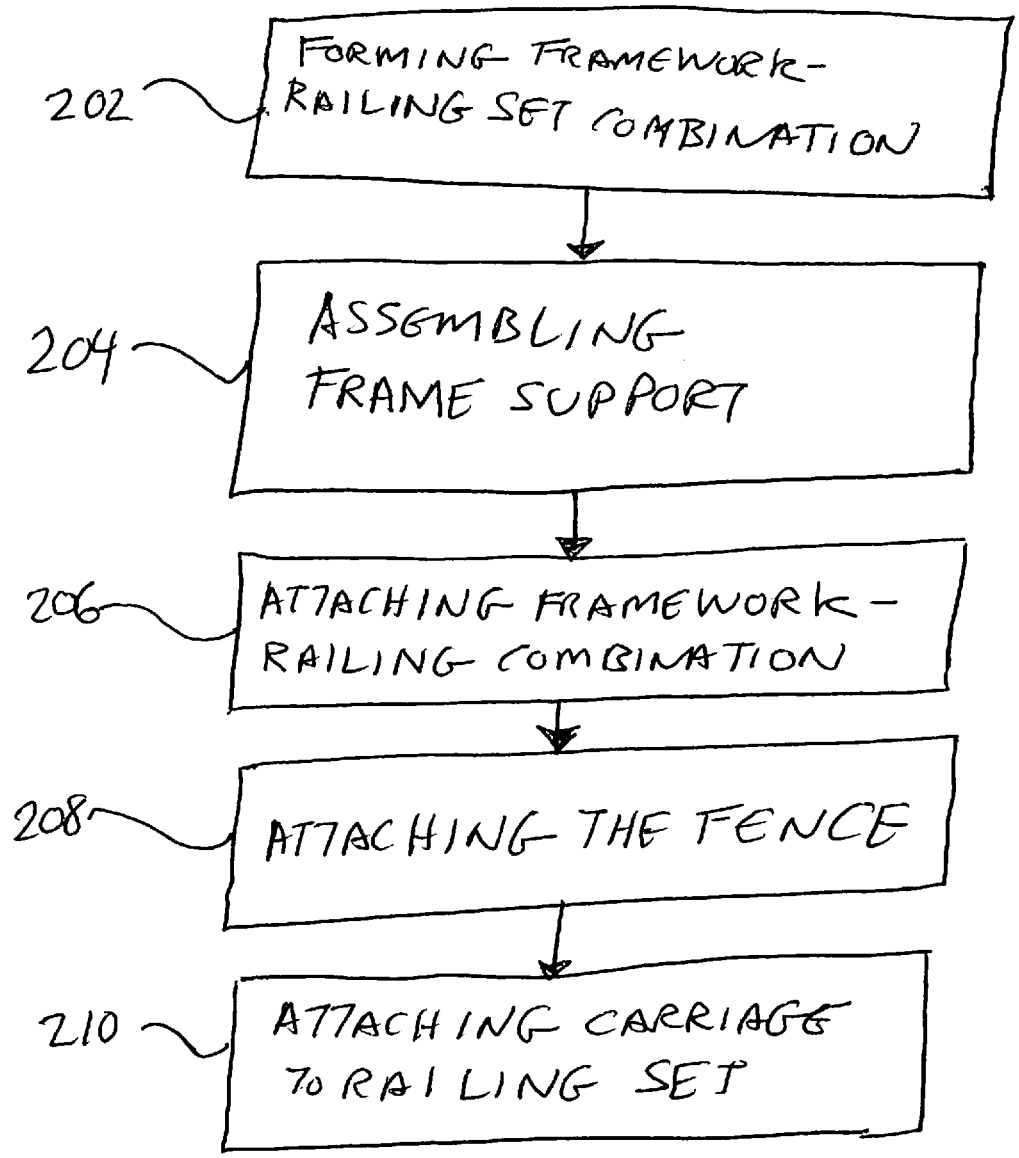
FIG. 25 is substantially a flow chart schematic showing one possible embodiment of process or method for operating the invention.

As substantially shown in FIGS. 23 and 24, the railing set 22 could further comprise a counterweight system 46 comprising one or more pulleys 48 mounted to the top end plate 40 through which runs a cord or cable 50 moving through an aperture in the top end plate 40 to connect the carriage 24 with a counterweight 52 hung behind the frame support 36. The counterweight system 52 could counteract or generally eliminate the weight of the carriage-powered cutting tool combination making easier for the operator to control the cutting action and movement of the combination along the railing set 22.

The framework 32 could have a construction to allow the framework 32 to be removably attach the railing set 22 as well as to the frame support 36. This construction could allow the framework 32 to be disassembled or otherwise broken down into a compact state for transport, storage or both. An indexing capability associated with the framework 32 could allow the framework 32 to be collapsed and reassembled without affecting the accuracy of the invention 10. This indexing capability could further assist the operator to place the invention 10 between compact state and operating state as desired without having to significantly realign the fence 35 when attaching the fence 35 to the framework 32.

In one possible embodiment, the framework 32 could comprise a pair of framework rails, a top framework rail 54 and a bottom framework rail 56. In one embodiment, the framework rails 54, 56 could be metal channel railings generally having a lateral C-shaped cross section. Each framework rail 54, 54 could removably attach (e.g., by threaded fasteners) along the length of the respective railing set end plate 40, 42. The framework 32 generally aligns and removably attaches the railing set 22 to the frame support 36 as well helps the coplanar alignment of the frame support 36. The overall thickness of the framework rails 54, 56 could further serve to generally denote or otherwise set the distance or gap 58 (e.g., regulating the upper range of the thickness of workpiece that can be acted upon by the invention 10) occurring between the railing set 22 and the frame support 36. The framework rails 54, 56 could removably attach to the frame support 36 to removably hold the railing set 22 in position to the frame support 36. Each framework rail 54, 56 could further have a removable position stop 55 such as a threaded bolt that will hit against the respective railing of the railing set to set the framework rail 54, 56 at the proper position for attachment to the respective end plate.

The frame support 36 could comprise of a pair of backing panels 60 with each backing panel being movably attached (e.g., by hinges) to support panel 64 (e.g., triangularly-shaped) that generally helps hold up the attached respective backing panel 60 up in a canted or semi-upright operating position. An end of a cross board 66 may removably connect to respective support panel to substantially hold the support panels in a spaced apart and parallel orientation to one another for additional standing ability for the frame support 36. A notch 68 in the support panel's hypotenuse side (e.g., if the support panel 68 is generally made like a right angled triangle) could removably engage a set of grooves 70 at the end of the cross board 66 to removably hold the cross board 66 to the support panels 64. The cross board 66 could further hold the two backing panels 60 apart from one another so the backing panels' inner edges could help delineate a cutting space 74 between the two backing panels 60.

The backing panels 60 could typically be made from metal, wood or other suitable materials to substantially insure cutting accuracy by generally ensuring that the backing panels 60 could substantially flat and planar. If either of the backing panels 60 are not substantially planar, an unwanted ledge (not shown) could otherwise result to interrupt or otherwise upset the placement or movement of the workpiece (not shown) relative to the invention. The ledge could also make the cutting operation more difficult and could result in an inaccurate cut. The ledge may cause the tool's cutting edge to dwell longer in one location upon the workpiece burning that portion of the workpiece. The backing panels 60 could be manufactured from one sheet of material (e.g., the same plywood sheet) to substantially limit warpage and the occurrence of the ledge.

The support panel 64 could folded against the respective backing panel 60 for a compact storage state (not shown). In the operating position, the support panel 64 is moved away from the backing panel 60 to be generally perpendicular to the backing panel 60. The bottom edge of the backing panel 60 may rest upon the ground in the operating position while a corner of the support panel 64 not in connected to the backing panel 60 can contact the ground as well. When support panel 64 is located generally perpendicular to the backing panel 60, the support panel 64 also serves to stiffen and straighten backing panel 60.

In another embodiment of the invention, not shown, the support panels could be dispensed with if the top of the invention 10 is brought to lean against a wall (not shown) for support (generally forming a "wall saw".) In this configuration, the back panels may require additional support or stiffener such as a one or more 2×4 boards (not shown) attached to the back pieces (38 & 40). Almost anything that is sufficiently straight and rigid may serve as an additional support. To generally ensure the invention does not move away from the wall unwantedly during operations, one or more suitable attachment means (such has hook and loop fasteners-not shown) may be used to removably attach the top edge of the invention to the wall.

The front of each baking panel 60 could support a two pairs of spacer blocks 76 with the outward side of the space block supporting a toggle clamp 80. One pair of spacer blocks 76 could be located proximate to the top of the backing panel 60 while another space block pair 76 could be located proximate the bottom of the backing panel 60. The spacer blocks 76 of a pair could be spaced apart from one another in a lateral orientation across the width of the backing panel 60.

Each framework rail 54, 56 could then run across the width of both backing panels 60. The bottom framework rail 56 could rest upon the top edges of bottom spacer blocks pair 76. The top framework rail 54 could rest proximate to the top edge of top spacer block pair 76. In one embodiment, the top framework rail 54 does not actually rest upon the top space block pair 76 but denotes a spacer block gap 82 that could provide enough flexibility in the invention 10 to allow the indexing system to substantially squarely locate the framework-railing set combination 34 upon the frame support 36. A toggle clamp 56 attached to each side of a respective spacer blocks 74 may removably hold the framework rail 54, 56 to blocking panel 60.

In another embodiment (not shown), the toggle clamps (56) and the spacer blocks (62) could be replaced with a plurality of threaded fasteners removably fastening the framework rails to the backing panels. An operator could opt to have spacer blocks of some kind to hold the framework-railing set combination initially in place while the threaded fasteners were installed; however, this generally not be a requirement for this embodiment.

Figure 5:
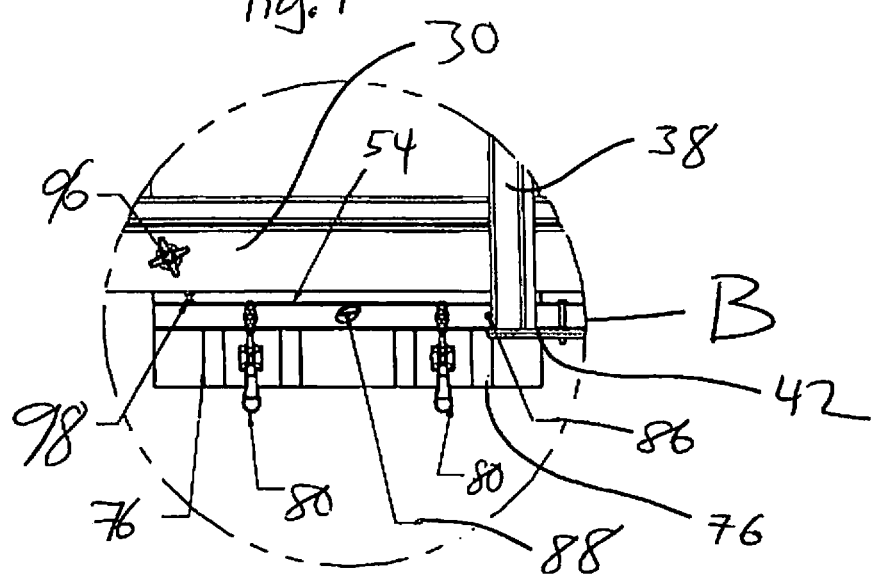
FIG. 5 is substantially a frontal elevation detail B view from FIG. 1 substantially showing front locking mechanism for fence and locking mechanisms for bottom framework portion of one possible embodiment of invention.
Figure 8:
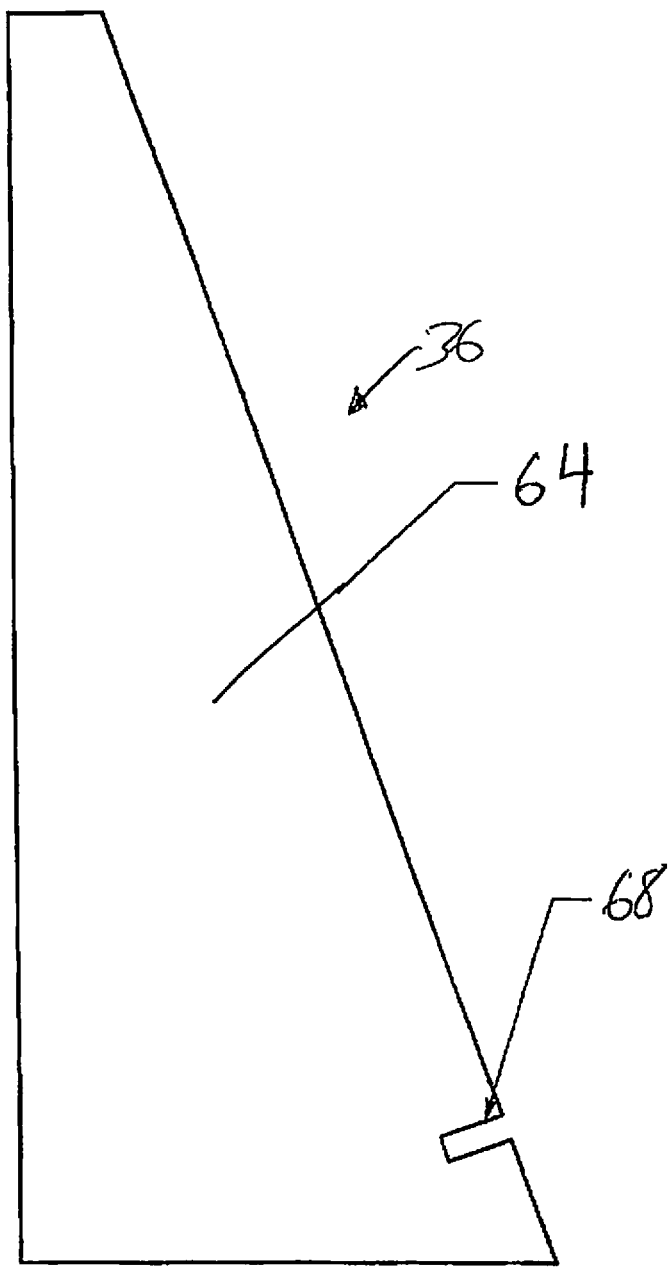
FIG. 8 is substantially a side elevation view of a backing panel for one possible embodiment of the invention.
Figure 9:
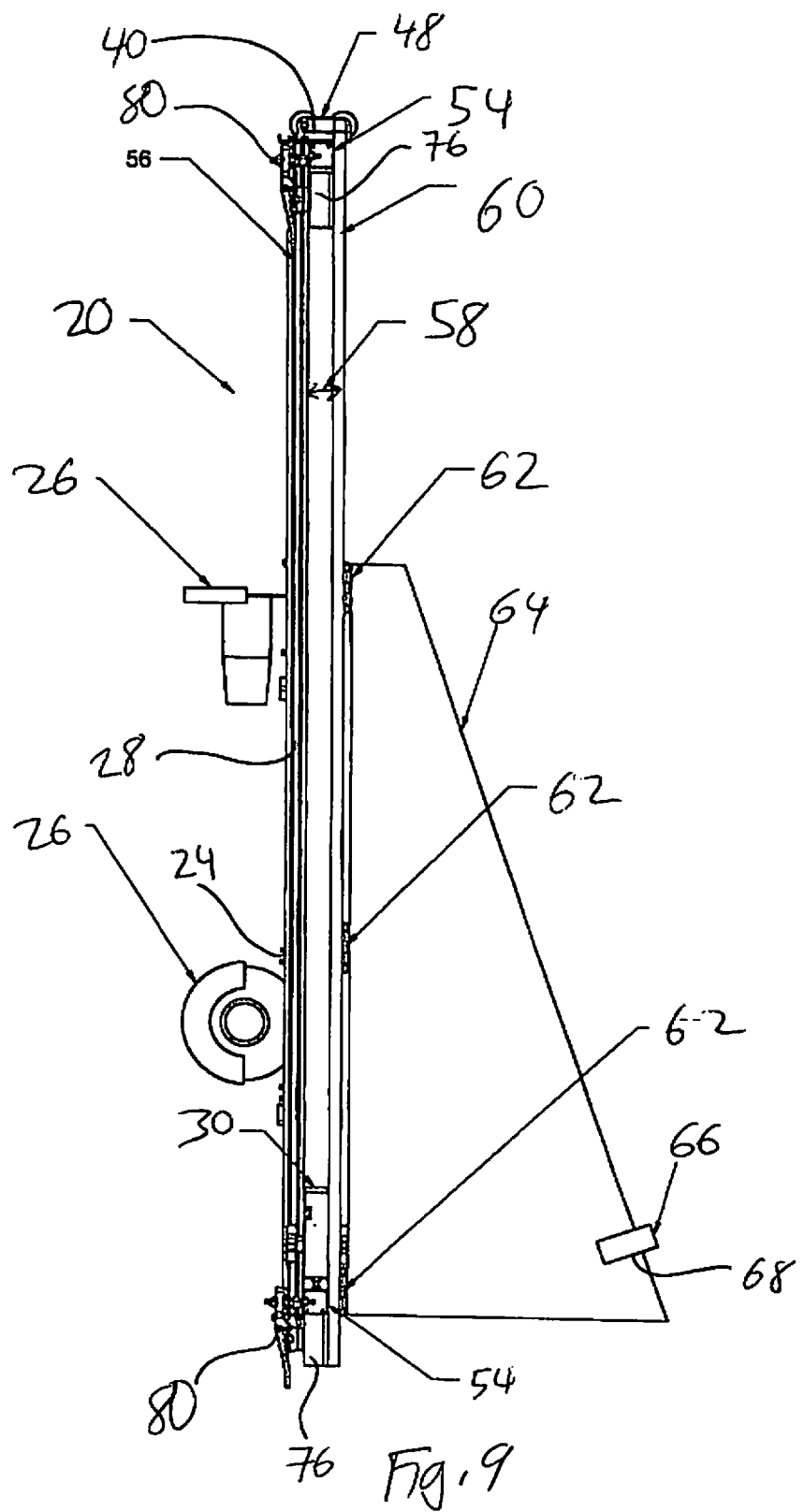
FIG. 9 is substantially a side elevation of one possible embodiment of the invention in a fully upright position further showing the carriage-power cutting tool combination in both vertical and horizontal orientations.
Figure 10:
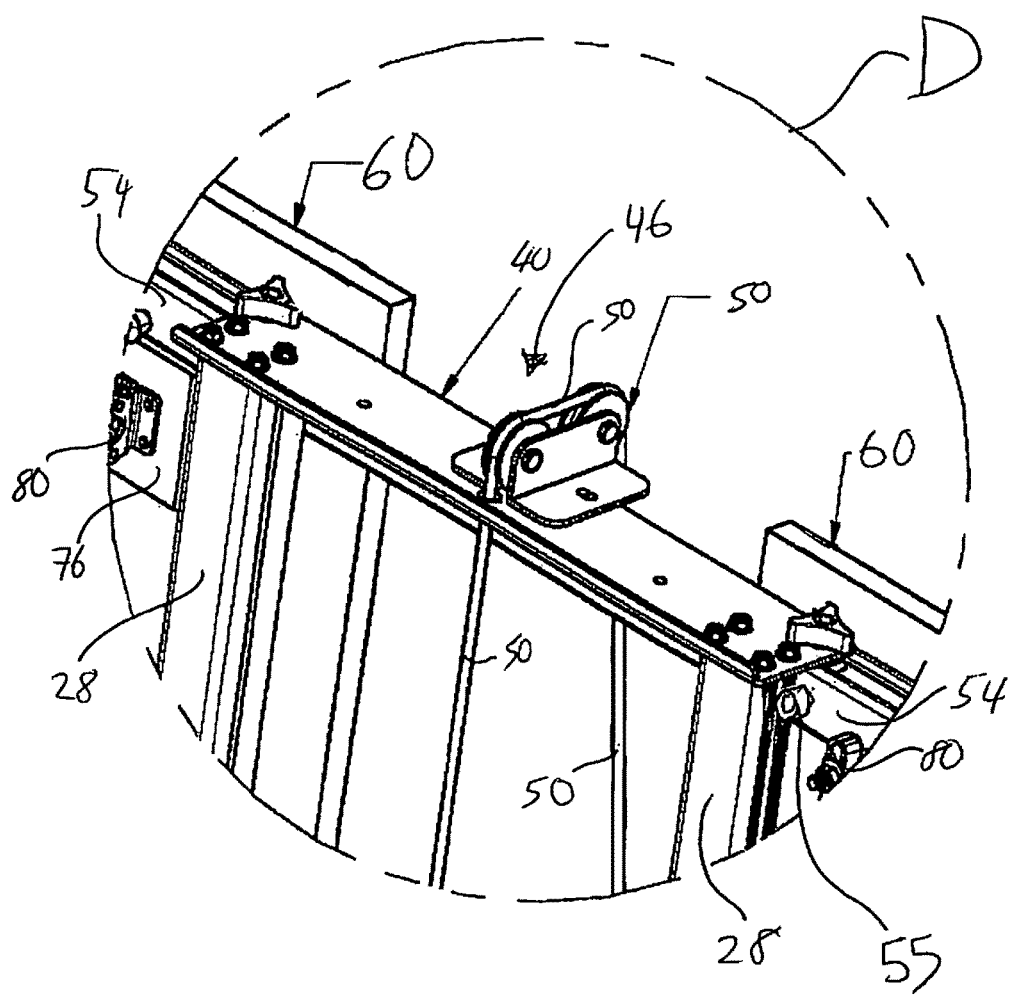
FIG. 10 is substantially a perspective detail D view from FIG. 2 substantially showing a pulley mechanism of one possible embodiment of counter weight system.
Figure 11:
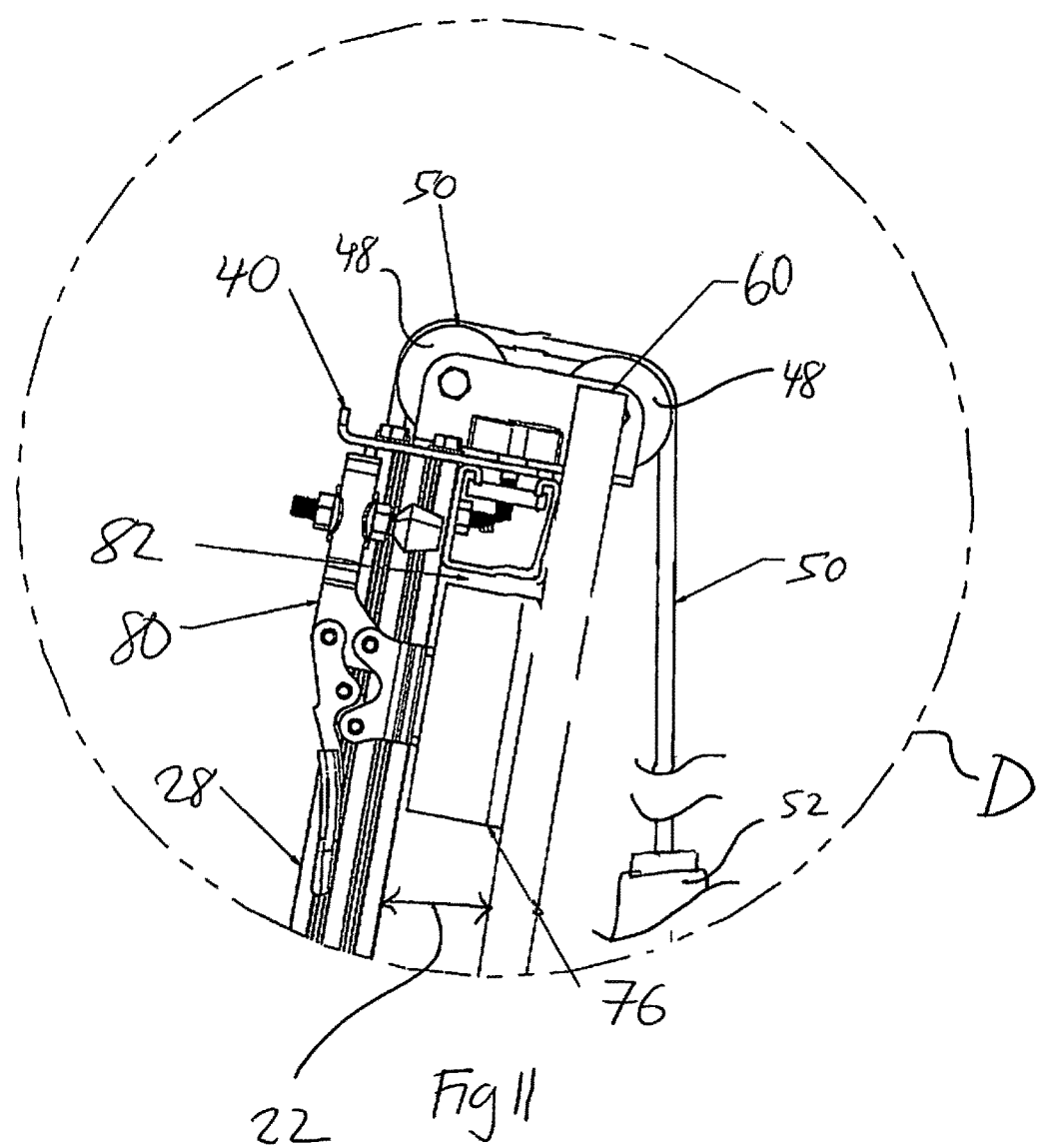
FIG. 11 is substantially a side elevation Detail D view from FIG. 2 substantially showing a pulley mechanism of one possible embodiment of counter weight system.
Figure 12:
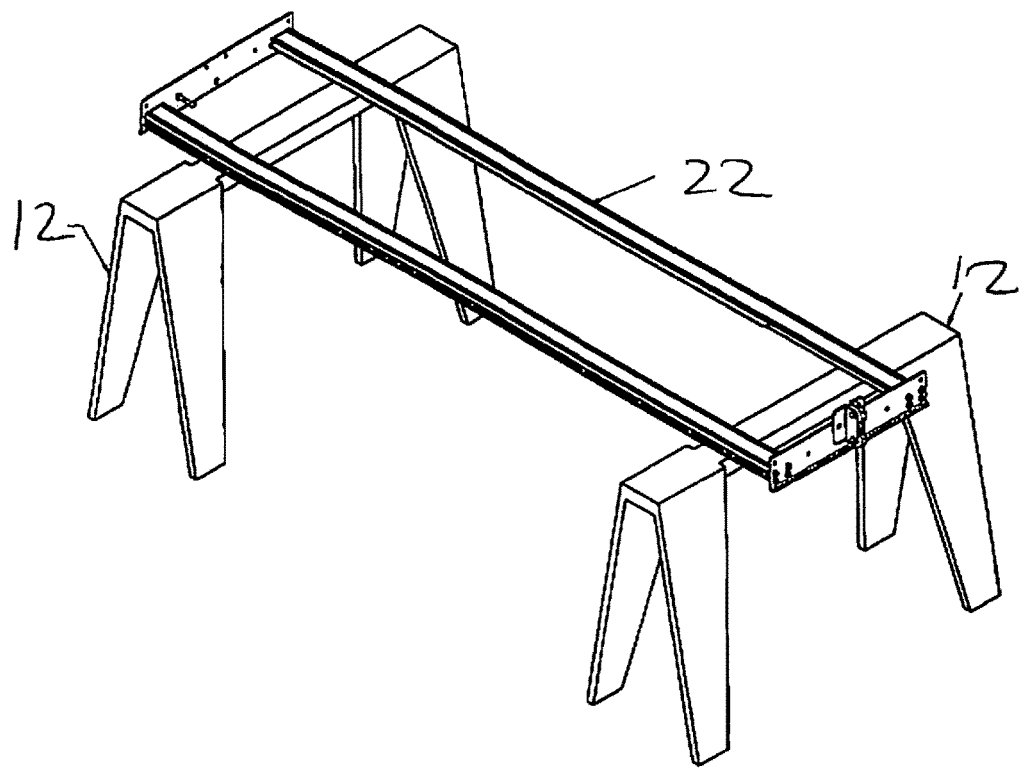
FIG. 12 is substantially a perspective view of a railing set supported by work horses for assembly of one possible one embodiment of the invention.
Figure 13:
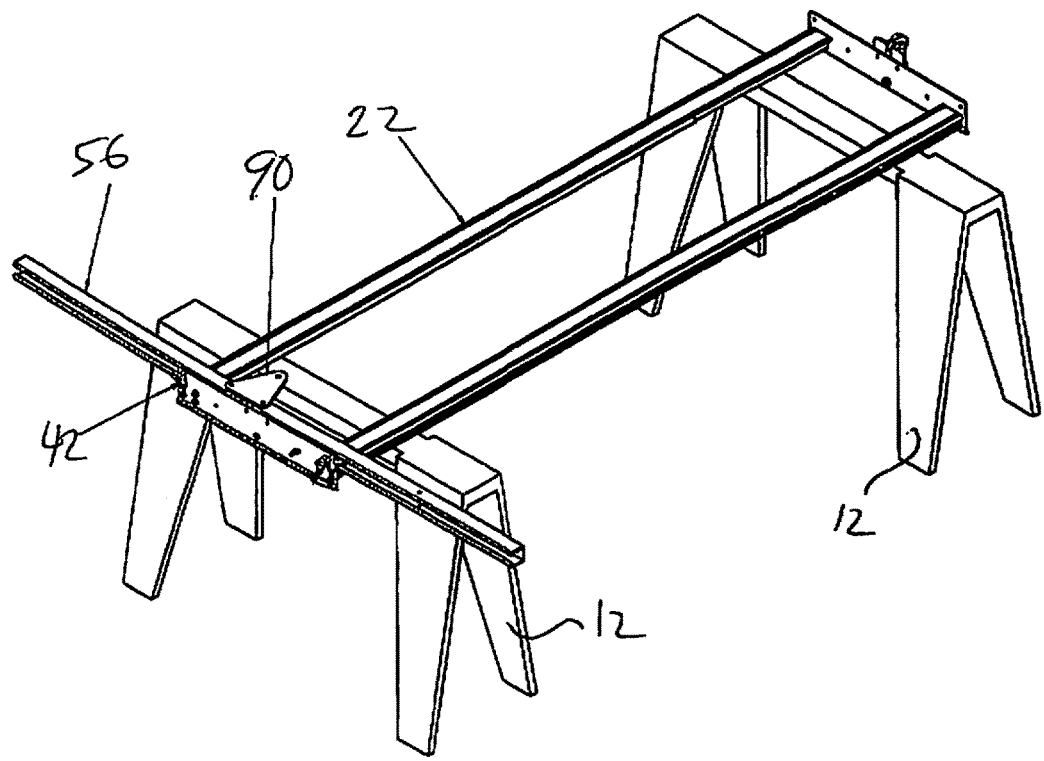
FIG. 13 is substantially a perspective view for the attachment of bottom framework portion as attached to the lower plate of the railing set in one possible embodiment of the invention.
Figure 14:
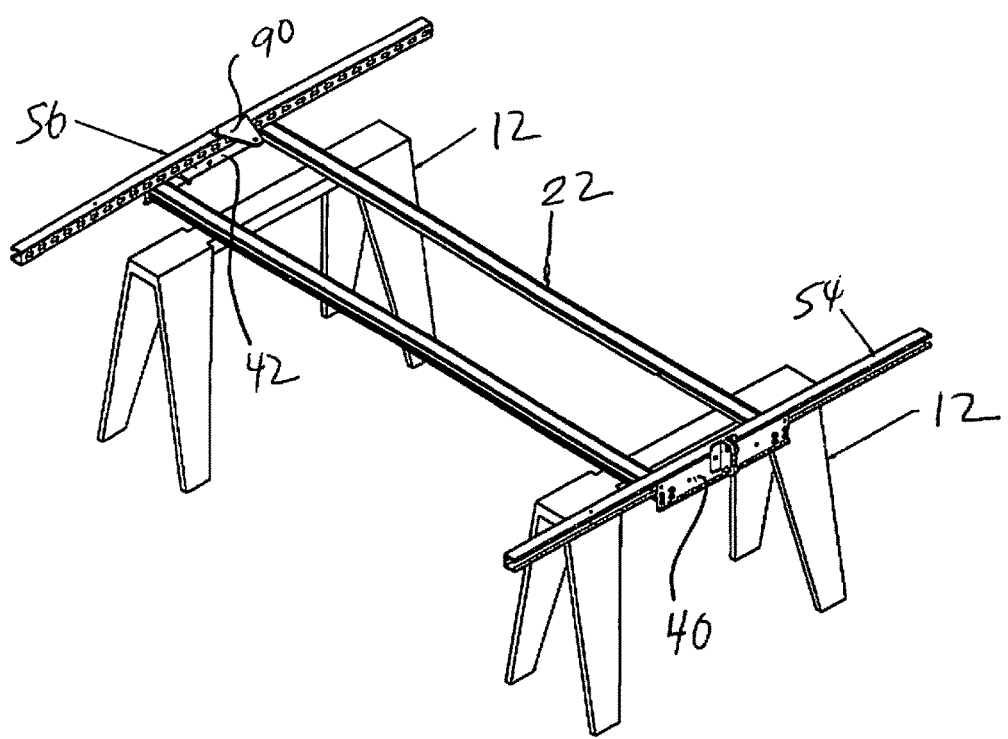
FIG. 14 is substantially a perspective view of the upper framework portion as placed with the upper end plate of the railing set in one possible embodiment of the invention.
Figure 15:
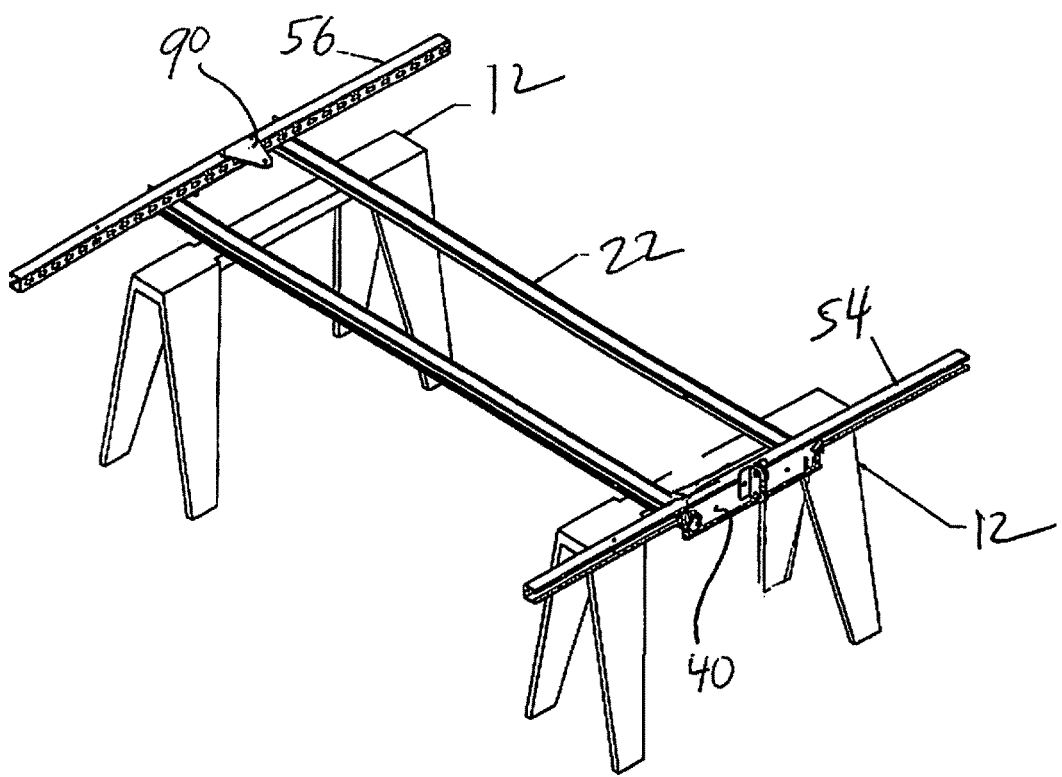
FIG. 15 is substantially a perspective view of the upper framework portion as being attached to the top end plate of the railing set in one possible embodiment of the invention.
Figure 16:
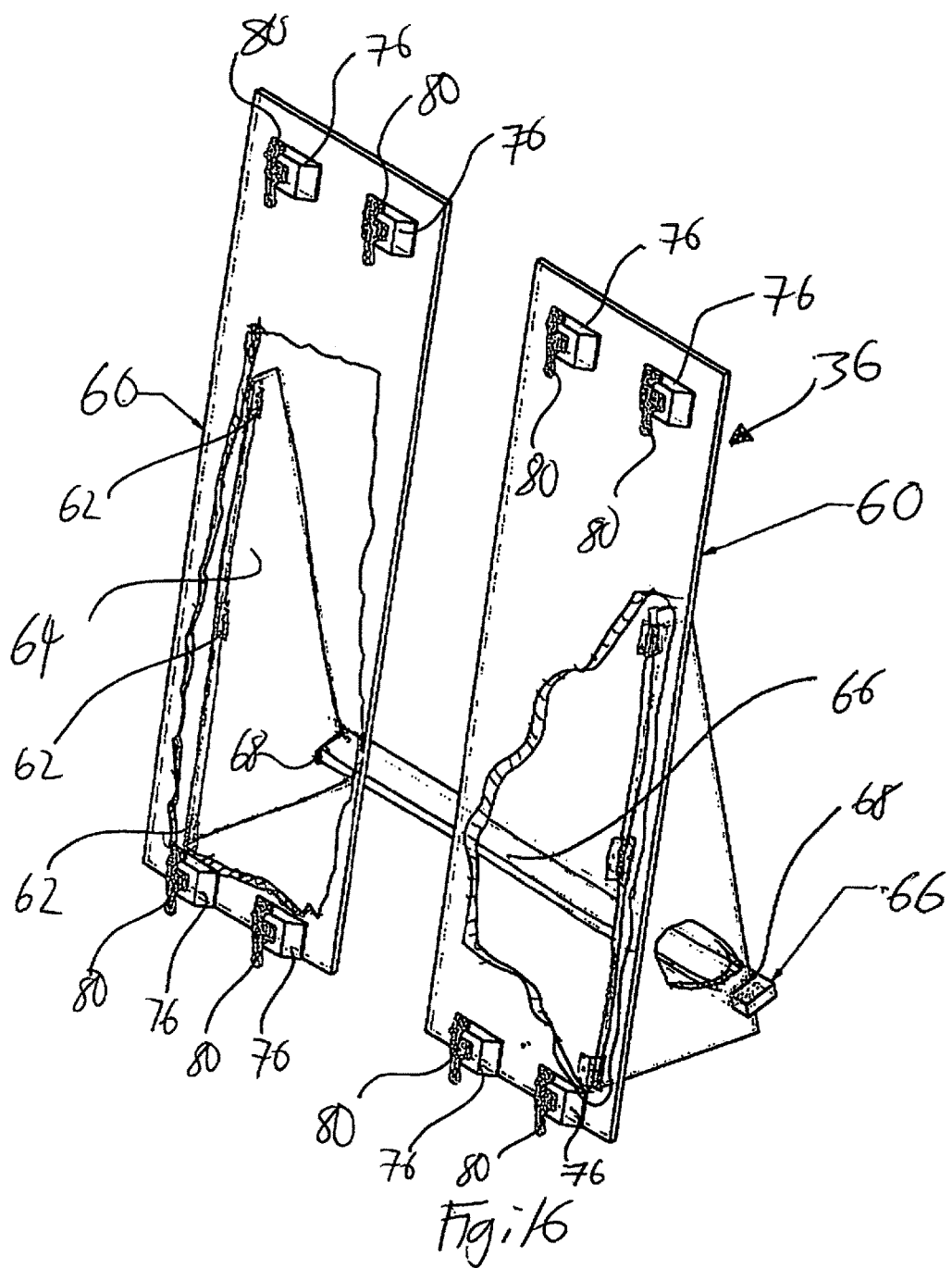
FIG. 16 is substantially perspective cutaway view of the assembled frame support in the operating position without the framework-railing set combination.
Figure 17:
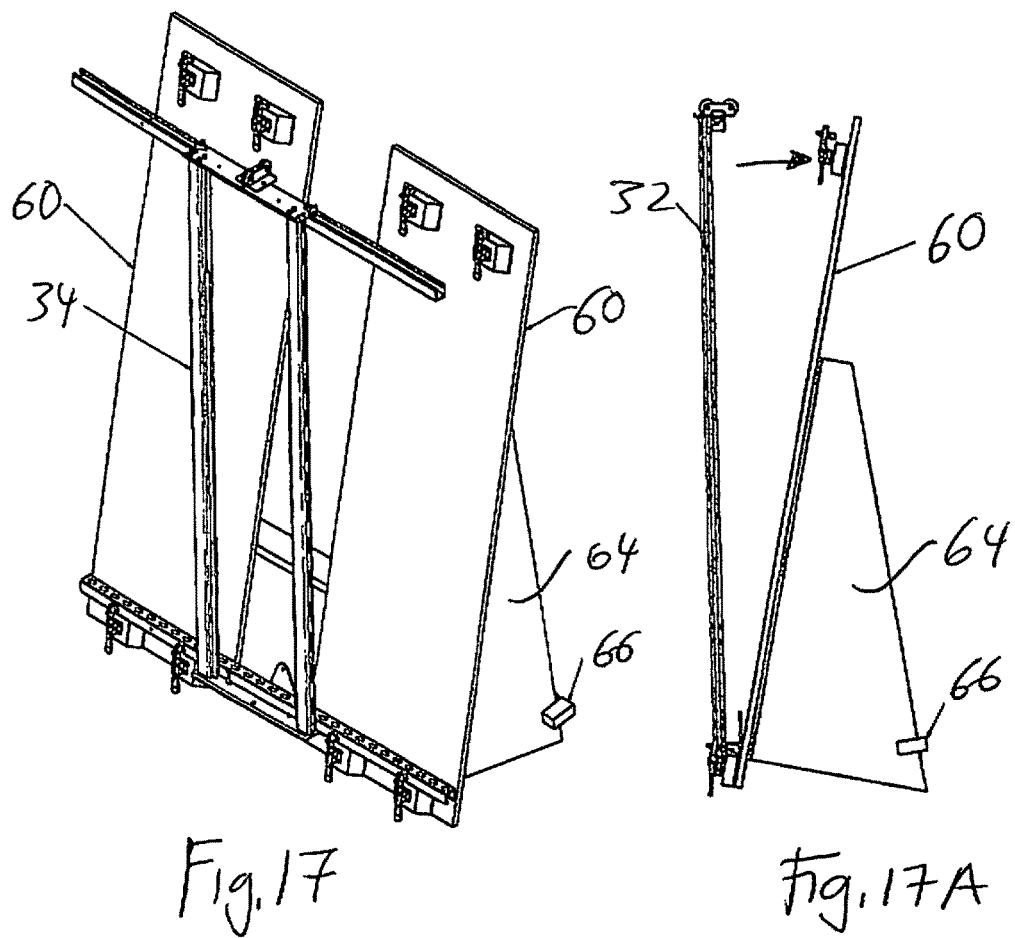
FIG. 17 is substantially a frontal perspective view of the framework-rail set combination being loaded upon the frame support in one possible embodiment of the invention.
Figure 18:
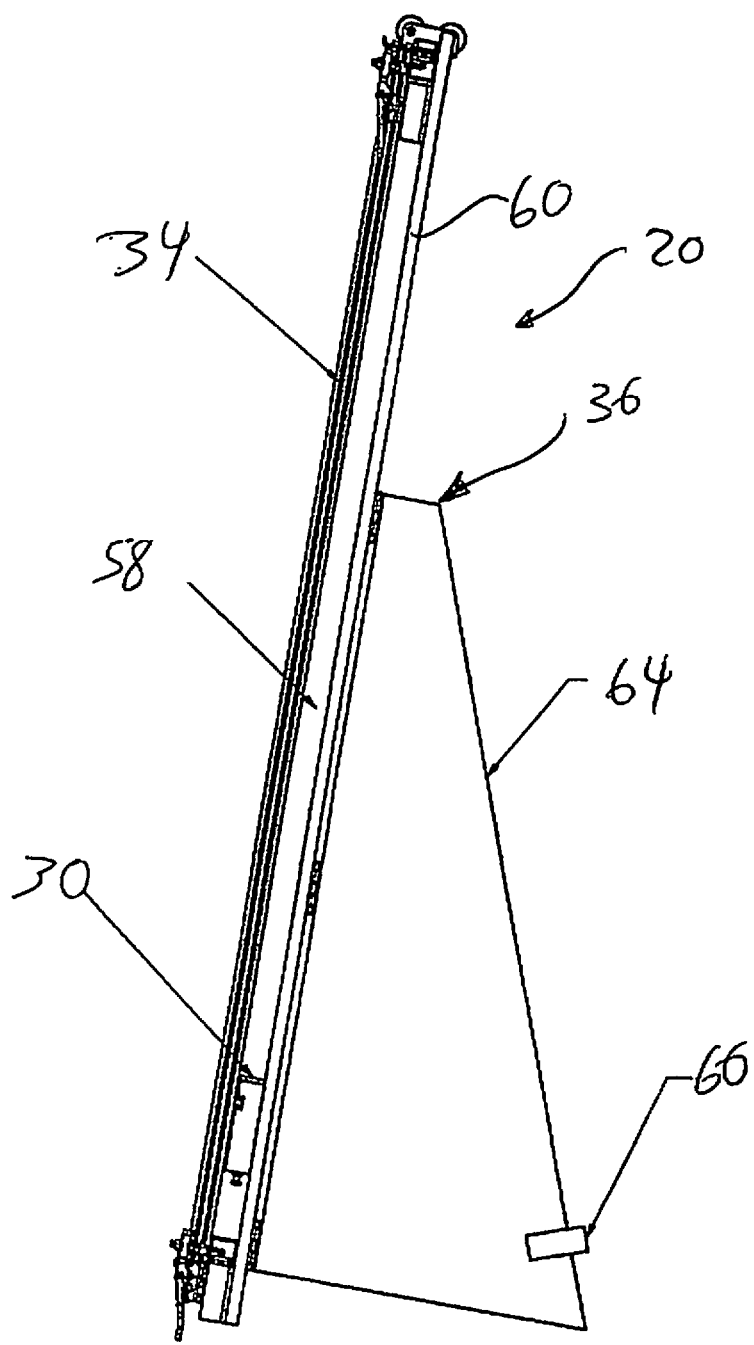
FIG. 18 is substantially a side elevation view of the framework-rail set combination being fully applied to frame support in one possible embodiment of the invention.
Figure 19:
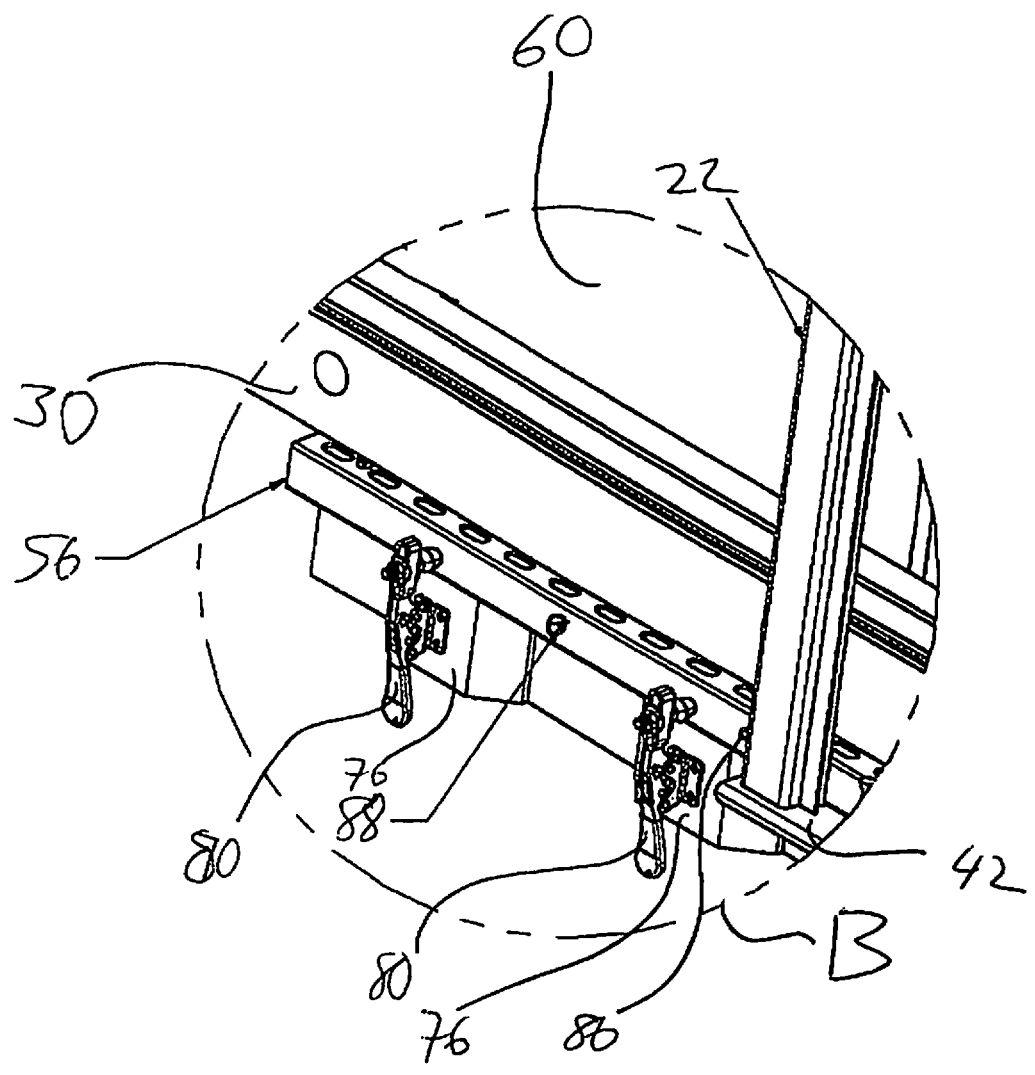
FIG. 19 is substantially a perspective detail B view from FIG. 1 substantially showing of the toggle locking mechanism for fence and indexing guides for bottom framework portion of one possible embodiment of invention.
Figure 20:
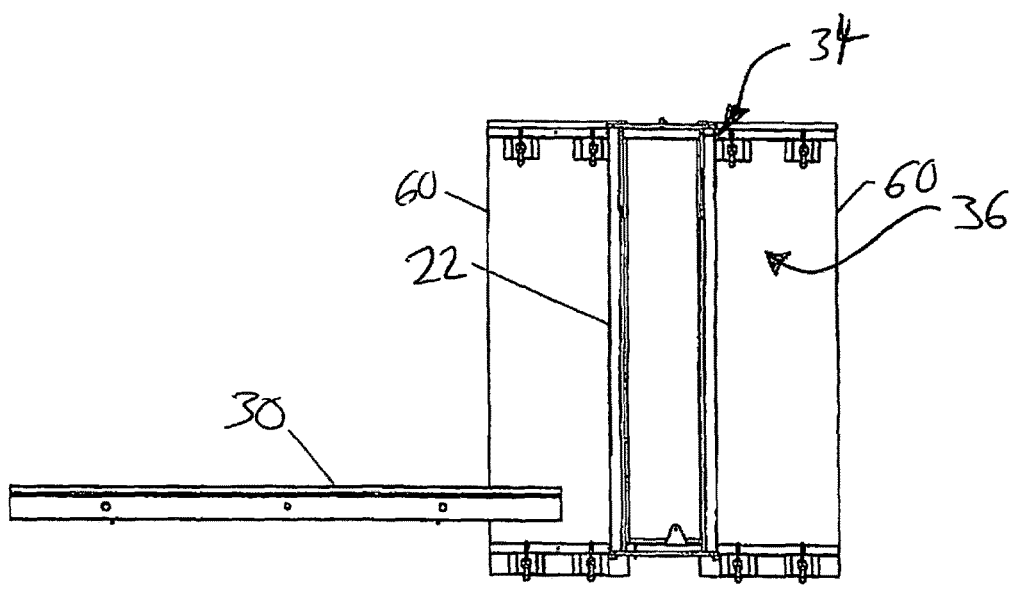
FIG. 20 is substantially a frontal elevation view of the fence being applied to the framework of one embodiment of the invention.
Figure 21:
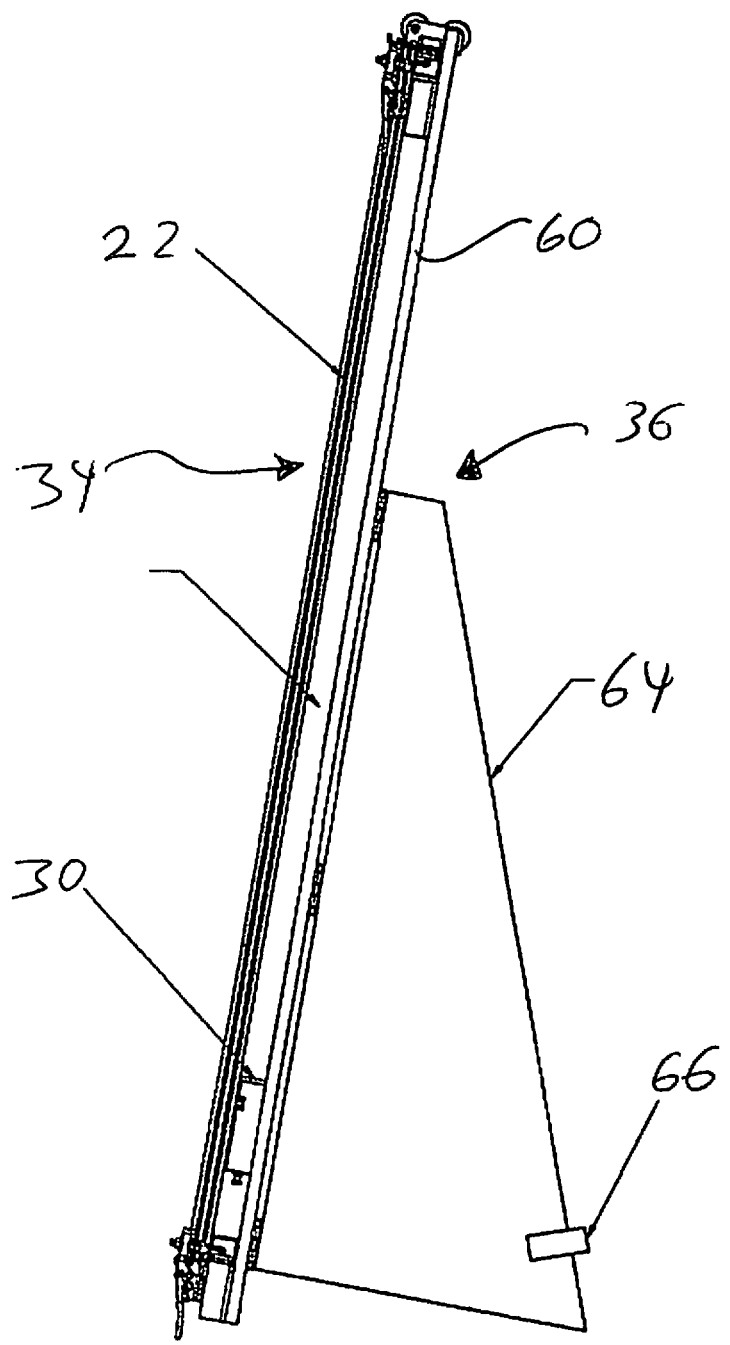
FIG. 21 is substantially a side elevation view of the fence being applied to the framework of one embodiment of the invention.
Figure 22:
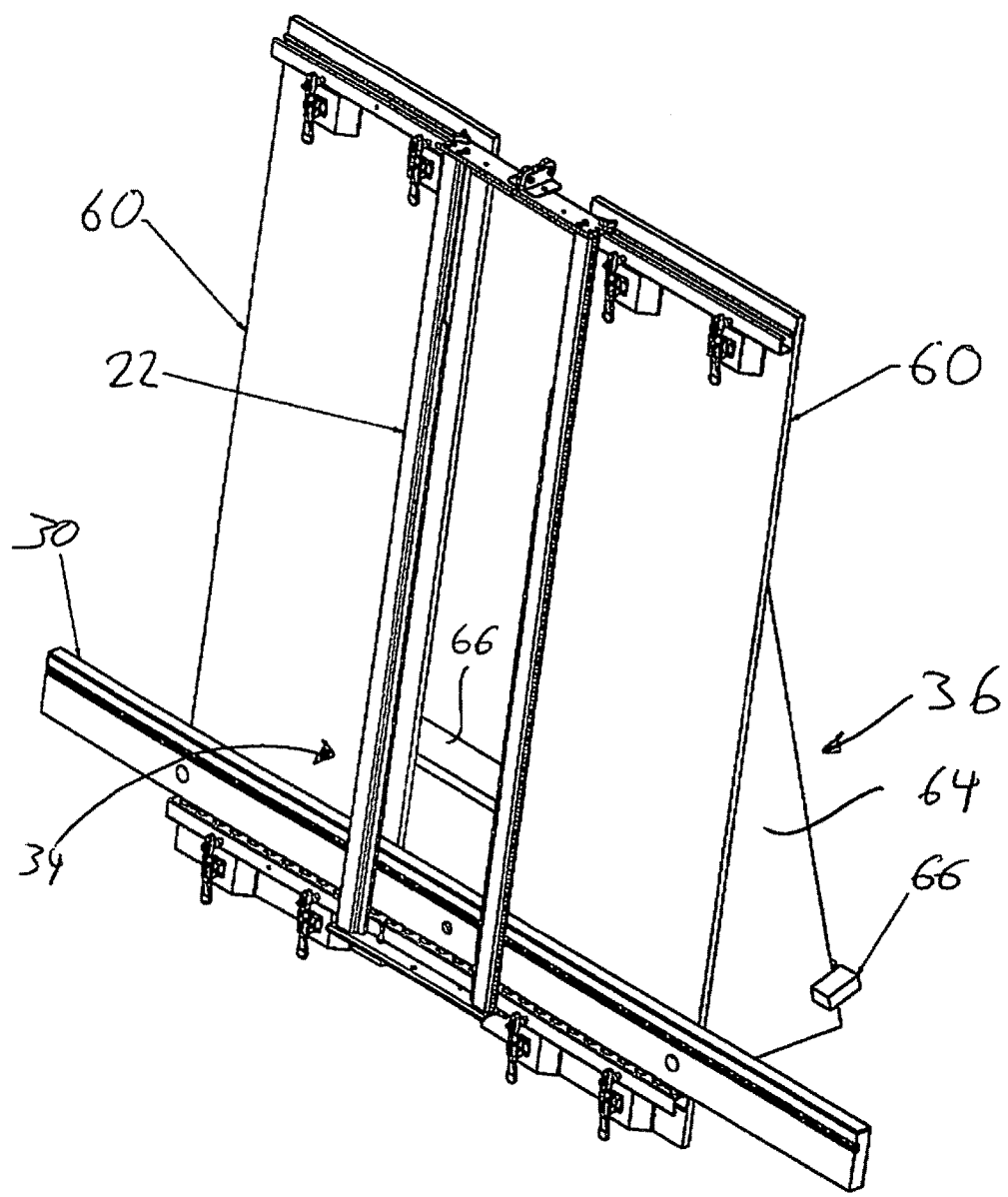
FIG. 22 is substantially a side elevation view of one embodiment of the invention in the canted operating position without the carriage-powered cutting tool combination.

The indexing capability as substantially shown in FIGS. 5 and 6 help square the placement of the framework and railing set combination 32 upon the frame support 36. The indexing system could comprise of an indexing channel 80 penetrating both the backing panel 60 and the respective framework railing and an indexing pin or fastener 78 that removably passes into the indexing channel 80 formed by framework railing and the backing panel 60. In this manner, the top and bottom of the backing panel 60 could be properly aligned with the top and bottom framework railings 54, 56.

The frame support 36 in this manner substantially provide a bifurcated support for any large flat surface of the workpiece (not shown) being cut by the invention. The workpiece could be one of a plurality of sheet goods such as plywood, particle board, medium density fiber board and many other such products. The spaced apart arrangement of the two backing panels 60 could define the cutting space 74 that may range from the top to the bottom of the backing panels 60. The cutting space 74 may be spaced as far apart as the railings 28 of the railing set 22. The cutting space 74 and could be substantially located beneath the railings 28 (e.g., a backing panel inner edge can be parallel to and located beneath a respective railing 28.) The cutting space 74 could accommodate at least a portion of the cutting edge (e.g., saw blade) of the power cutting tool 26 to generally prevent the cutting edge from contacting the backing panels 60 during operations. The cutting space's vertical length may be long enough to accommodate the movement, positioning or both of the carriage-power cutting tool combination to effectively cut any suitable workpiece that can be placed or moved between the railing set 22 and frame support 36.

The cutting space 74 may allow the operator (not shown) to move the carriage-power cutting tool combination up and down the railing set when the tool's cutting surface (e.g., a saw blade) is substantially parallel to the fence 30. If the operator desires to cut all the way through the workpiece, the saw blade could pass all the way through the workpiece and into the cutting space 74 as denoted between the backing panel pair 60. Without such a cutting space 74, the operator may have to adjust (e.g., retract) the cutting power tool's cutting edge to prevent the unwanted cutting of the backing panel(s) 60. The cutting space's other dimensions, such a width, could further allow the carriage to be placed in the vertical orientation for a rip cut wherein the attached power tool's cutting edge (e.g., saw blade) could be parallel to the channel railings (e.g., and the fence.) The vertically oriented saw blade could then pass through the workpiece during rip cut sawing operations and the backing panels 60 as needed.

The fence 30 could be a rectangular bar made of metal, wood or the like could be used to assist controlling cutting accuracy of the invention 10. Particularly for the vertical cut, if the fence 30 is not perpendicular to the path of the power cutting tool 26 as it travels on the rail set 22, then the resulting workpiece cut may not be perpendicular (90°) to the respective workpiece edge (e.g., that is held or moved on the fence 30) as desired and inaccuracy will result.

Figure 4:
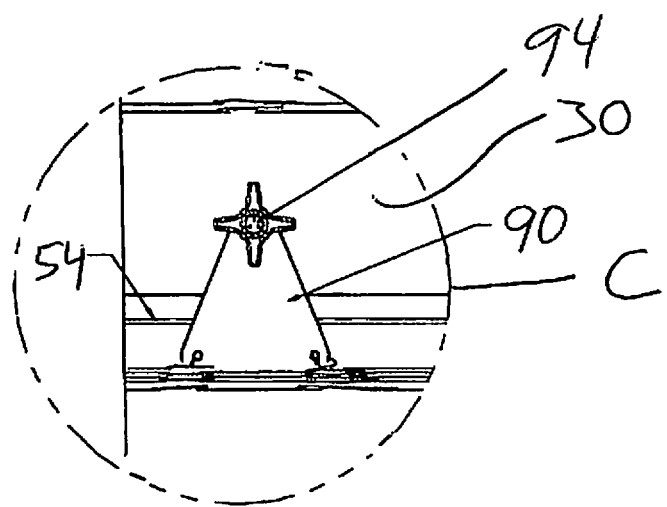
FIG. 4 is substantially a rear elevation detail C view from FIG. 3 substantially showing center locking mechanism for the fence for one possible embodiment of the invention.

As substantially shown in FIG. 4, the fence 46 could be located atop the bottom framework railing 56 to movably attached to a pivot plate 90 generally located in the middle of the backside of the bottom framework rail 56. The pivot plate 90 could be located between the back panels 60 within the cutting space 74 when the framework 32 is attached to the frame support 36. The pivot plate 90 could be removably attached by threaded fasteners or the liked to the back of the bottom framework rail 56. In one possible embodiment (not shown), the pivot plate 90 could be permanently fastened (e.g., by rivets) to the bottom framework rail 56. A knob assembly 94 (e.g., comprising a plastic headed threaded fastener) could removably hold the fence 30 to the pivot plate 90. This knob assembly 92 could provide an axis about which the fence 30 may slightly rotate or pivot when squaring up the fence 30 to be substantially perpendicular to the railing set 22. A fence screw assembly 96 could be located on each half of the fence 30 proximate to a respective end of the bottom framework railing 56. The fence screw assembly 96 could engage (e.g., penetrate) the respective backing panel 60 to help hold the fence 30 in its desired pivoted orientation. In at least one embodiment, a secondary screw assembly 92 generally attached to the backing panel 60 between the fence 30 and the top of lower frame support rail 56 could further support the fence in a desired orientation.

As substantially shown in FIGS. 12-25, one possible embodiment of the invention 10 could be the method or process 200 for the assembly of the collapsible portable panel 20. The process 200 could start with step 202, forming the framework-railing set combination. The railing set 22 could be taken out of storage (not shown) and placed upon temporary support such a pair of work horses 12 and held in a horizontal position. The bottom framework rail 56 could be removably attached by threaded fasteners or like to the bottom end plate 42, the threaded fasters acting as an alignment apparatus. If the pivot plate 90 was not attached to the bottom framework rail 56, the pivot plate 90 could be attached by faster to the bottom framework rail 56. Similarly, the top framework rail 54 could similarly removably attached by threaded fasteners or alike to the top end plate 40. As the step 202 is substantially completed, the process 200 could proceed to step 204, assembling frame support.

In step 204, assembling frame support, the backing panels 60 with their movably attached support panels 64 could be removed from storage (not shown). The support panels 64 could be swung out in a perpendicular manner away from the backing panel backsides so that the backing panels 60 could be stood up in canted manner wherein the bottom edges of the backing panels 60 and non-connected bottom corners of the support panels 64 rest upon the ground. The support panels 64 further acting to stiffen and strengthen the backing panels 60. Once so erected, a cross board 66 can removably engaged the support panels 64 to increase the standing and carrying ability of the frame support 36. The cross board 66 can also initially help hold the two backing panels 60 in spaced apart but coplanar condition. Once this step is substantially completed, the process 200 could proceed to step 206, attaching the framework-railing set combination to the frame support.

In step 206, attaching the framework-railing set combination to the frame support, an indexing pin 88 could be brought into contact with a respective indexing channel portions of the bottom framework rail 56 and the top framework rail 54 to properly align framework-railing set combination 34 when the combination 34 is applied to the frame support 36. The bottom framework rail 54 can be placed on the tops of bottom spacer block pairs set 76 to allow the framework-railing set combination 34 to be substantially rotated until the upper framework rail 54 makes contact with the backing panels 60 as substantially shown in FIGS. 17 and 18. The bottom framework rail can be shifted along the top of the spacer blocks 76 until the index channel portion of the bottom framework aligns with its counterpart index channel portion of the backing panel as substantially shown in FIG. 19. Once in alignment, the indexing pin 88 may be inserted through both index channel portions 86 until the toggle clamps 80 are engaged generally preventing the framework-railing set combination 34 from moving out of proper configuration with the frame support 36. The indexing pin 88 may then be removed and the process could be repeated with the top framework rail 54 and frame support 36.

Once the top framework rail is so aligned, the upper toggle clamps 80 are engaged to the top framework rail 54 and the indexing pins 88 are removed from respective index channels 86. In one possible embodiment, index channels 86 can generally be found on one backing panel 60, one side of the framework rails 54, 56 (e.g., left panel, left sides of the framework rails) so the toggle clamps 80 on the right backing panel 60 may be engaged without aligning the right sides of the framework rails 54, 56 with the right backing panel 60. The right backing panel 60 need only be located such that the bottom framework rail 56 is in contact with the top of the right backing panel spacer blocks 76 and close enough that the respective toggle clamps 80 can be engaged. The attachment of the framework rails 56, 54 to the frame support 36 generally insure that the backing panels 60 are substantially coplanar; that the cutting space 74 is properly delineated between the two backing panels 60 and that the gap 58 between the framework rails 54, 56 and the backing panels 60 is substantially consistent between the top and bottom of the backing panels 60. Once step 206 is substantially completed, the process 200 could continue onto step 208, attaching the fence.

In step 208, attaching the fence, the fence 30 could be inserted between the frame support 36 and the framework-railing set combination 34 to be movably attached to the pivot plate 90 by means of the knob assembly 94. Fence screw-assemblies 96 could be installed to the fence 30 and the backing panels 60 for additional securement of the fence 30. The fence 30 may be further supported by means of the secondary screw assemblies 98 (e.g., jacking screws) located below each end of the bottom framework rail (54). Once this step is substantially completed, the process 200 can generally proceed to step 210, attaching carriage to the railing set.

In step 210, attaching carriage to the railing set, the carriage 24 may removably engage the railing set 22 to move generally along the length of the railings 28. A suitable power cutting tool 26 could then be removably attached to the carriage 24. The cord, rope or cable 50 could be connected to a counterbalance weight 52 located behind the frame support 32. The cord 50 could then be threaded through the pulleys 48 and then through a center hole in the top end plate (24) to be secured to the carriage 24. At this time the invention could be seen as being ready for general use. Disassembly of the portable collapsible panel saw 10 generally is the reverse of the steps of the process 200.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:
1. A panel saw comprising:
(A) a railing set, railings of the railing set being held in a parallel and spaced-apart orientation to one another to movably support a power cutting tool-carriage combination capable of moving along at least a portion of a length of the railing set;
(B) a framework that removably attaches to the railing set, the framework further removably connects the railing set to a frame support that holds the railing set in a canted or semi-upright operating position;
(C) the frame support comprising two backing panels, each backing panel having a movably connected support panel that when placed perpendicular to the respective backing panel allows the placement of the respective backing panel in a canted or semi-upright operating position;
wherein the framework removably attaches to the two backing panels to hold the two backing panels in a spaced apart, coplanar relationship to one another creating a cutting space between the two backing panels, the cutting space accommodates a cutting edge of a power cutting tool of the power cutting tool-carriage combination between the two backing panels during operation without cutting edge contacting the two backing panels;
wherein the framework comprises two framework railings, a top framework railing and a bottom framework railing, each framework railing removably attaches to a respective end of the railing set to be perpendicularly oriented to the railing set;
wherein the top framework railing removably attaches to the tops of both backing panels while the bottom framework railing removably attaches to bottoms of both backing panels;
wherein the bottom framework railing rests upon spacer blocks at the bottoms of both backing panels to allow the top framework railing to pivot onto the tops of both backing panels.

2. The vertical panel saw of claim 1 further comprises a pin-channel based indexing system that properly locates the backing panels along the bottom framework railing as well as along the top framework rail, the pin-channel based indexing system comprising at least pair of index pins and at least one removable position stop, the one at least pair of index pins making removable penetration with either the top or bottom framework rail and the frame support and the at least one removable position stop to properly position at least one end of the railing set upon a respective framework rail.

3. The vertical panel saw of claim 2 wherein the attachment devices on the spacer blocks removably hold the bottom framework railing to both backing panels.

4. The panel saw of claim 1 further comprising a gap between the top framework rail and the pairs of spacer blocks at the tops of the backing panels, the gap accommodates adjustment movement of a framework-railing set combination upon the frame support.

5. The vertical panel saw of claim 2 further comprising a cutting fence pivotally connected to the bottom framework railing.

6. The vertical panel saw of claim 5 wherein a fastener at each end of the cutting fence connects the cutting fence to a respective backing panel.

7. The vertical panel saw of claim 1 wherein the cutting space allows the cutting edge of the power cutting tool of the power cutting tool-carriage combination to pass between the backing panels when the power cutting tool-carriage combination is operating in either a perpendicular orientation or in a parallel orientation to the railing set.

8. The vertical panel saw of claim 1 further comprising a cross board that removably attaches to both support panels to hold the support panels in a spaced apart and parallel orientation.

9. The vertical panel saw of claim 8 wherein the cross board further holds the backing panels in a spaced apart and coplanar orientation.

10. The vertical panel saw of claim 1 wherein an edge of the backing panel is held parallel and coplanar to a railing of the railing set.

11. The vertical panel saw of claim 2 wherein the railing set bisects the top and bottom framework railings.

* * * * *